US011216744B2

(12) United States Patent
Sethi et al.

(10) Patent No.: US 11,216,744 B2
(45) Date of Patent: Jan. 4, 2022

(54) FEATURE-SPECIFIC ADAPTIVE MODELS FOR SUPPORT TOOLS

(71) Applicant: Cisco Technology, Inc., San Jose, CA (US)

(72) Inventors: Kabiraj Sethi, Fremont, CA (US); Ajith Chandran, San Jose, CA (US); Amitesh Shukla, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 1060 days.

(21) Appl. No.: 15/582,559

(22) Filed: Apr. 28, 2017

(65) Prior Publication Data
US 2018/0314958 A1    Nov. 1, 2018

(51) Int. Cl.
*G06N 20/00*    (2019.01)
*G06Q 10/00*    (2012.01)
(Continued)

(52) U.S. Cl.
CPC ............... *G06N 20/00* (2019.01); *G06N 5/02* (2013.01); *G06Q 10/00* (2013.01); *G06Q 10/10* (2013.01); *G06Q 10/20* (2013.01)

(58) Field of Classification Search
CPC .......... G06N 20/00; G06N 5/02; G06Q 10/00; G06Q 10/10; G06Q 10/20
See application file for complete search history.

(56) References Cited

U.S. PATENT DOCUMENTS 9,449,278 B2    9/2016 Davlos et al.
9,495,395 B2    11/2016 Chan et al.
(Continued)

FOREIGN PATENT DOCUMENTS

WO    WO-2015148328 A1 * 10/2015    ......... H04L 41/0636

OTHER PUBLICATIONS

Sasisekharan et al., "Using Machine Learning to Monitor Network Performance", Aug. 6, 2002, Proceedings of the Tenth Conference on Artificial Intelligence for Applications, pp. 92-98 (Year: 2002).*

*Primary Examiner* — Alan Chen
*Assistant Examiner* — Brent Johnston Hoover
(74) *Attorney, Agent, or Firm* — Behmke Innovation Group LLC; James M. Behmke; James J. Wong

(57) ABSTRACT

In one embodiment, a machine learning server in a computer network determines a plurality of computing features shared across a given set of computing products, and collects, from each computing product of the given set, problem-solution data for each computing feature of the plurality of computing features. Problem-solution data is indicative of problems related to a respective computing feature, attempted solution actions for the problems, and outcomes of the attempted solutions on the problem. The machine learning server updates a machine learning model of suggested solutions for computing-feature-specific problems based on the collected problem-solution data, and provides, based on the machine learning model, a particular suggested solution for a particular computing-feature-specific problem to a particular computing product. An outcome of the particular suggested solution for the particular computing-feature-specific problem on the particular computing product may then be fed back to the machine learning server as collected problem-solution data.

17 Claims, 8 Drawing Sheets

(51) Int. Cl.
*G06N 5/02* (2006.01)
*G06Q 10/10* (2012.01)

(56) References Cited

U.S. PATENT DOCUMENTS

| | | | |
|---|---|---|---|
| 2004/0068476 A1* | 4/2004 | Provost | G06N 5/025 |
| | | | 706/45 |
| 2015/0347902 A1* | 12/2015 | Butler, Jr. | G08B 13/122 |
| | | | 706/46 |
| 2016/0091913 A1 | 3/2016 | Pani | |
| 2016/0094477 A1 | 3/2016 | Bai et al. | |
| 2016/0140454 A1* | 5/2016 | Gupta | G06N 5/022 |
| | | | 706/12 |

* cited by examiner

FEATURE-SPECIFIC ADAPTIVE MODELS FOR SUPPORT TOOLS

TECHNICAL FIELD

The present disclosure relates generally to computer systems, and, more particularly, to feature-specific adaptive models for support tools.

BACKGROUND

There are countless computer technologies in the world today, the magnitude of which being amplified by the many different combinations of computer hardware, software, and firmware. Generally, support personnel, such as technical assistance engineers, operate in a given realm of expertise, such as working for a particular company in a particular technology department (e.g., smartphones versus laptops offered by the company). However, even for a less ubiquitous technology area, such as enterprise switches, there could still be millions of instantiations of technological combinations.

Currently, customer issues, or even internal debugging efforts, are handled in isolation by support personnel or else are waiting for engagement by specific technical assistance engineers. Often, the only source of information available for solving these issues is a query tool for looking through notes of similar issues previously addressed, or word-of-mouth suggestions coming from others skilled in the technology area. Given the vast number of computer technologies and combinations, such static and unstructured data is difficult to mine, resulting in inefficiencies or even complete inability to solve the issues at hand.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
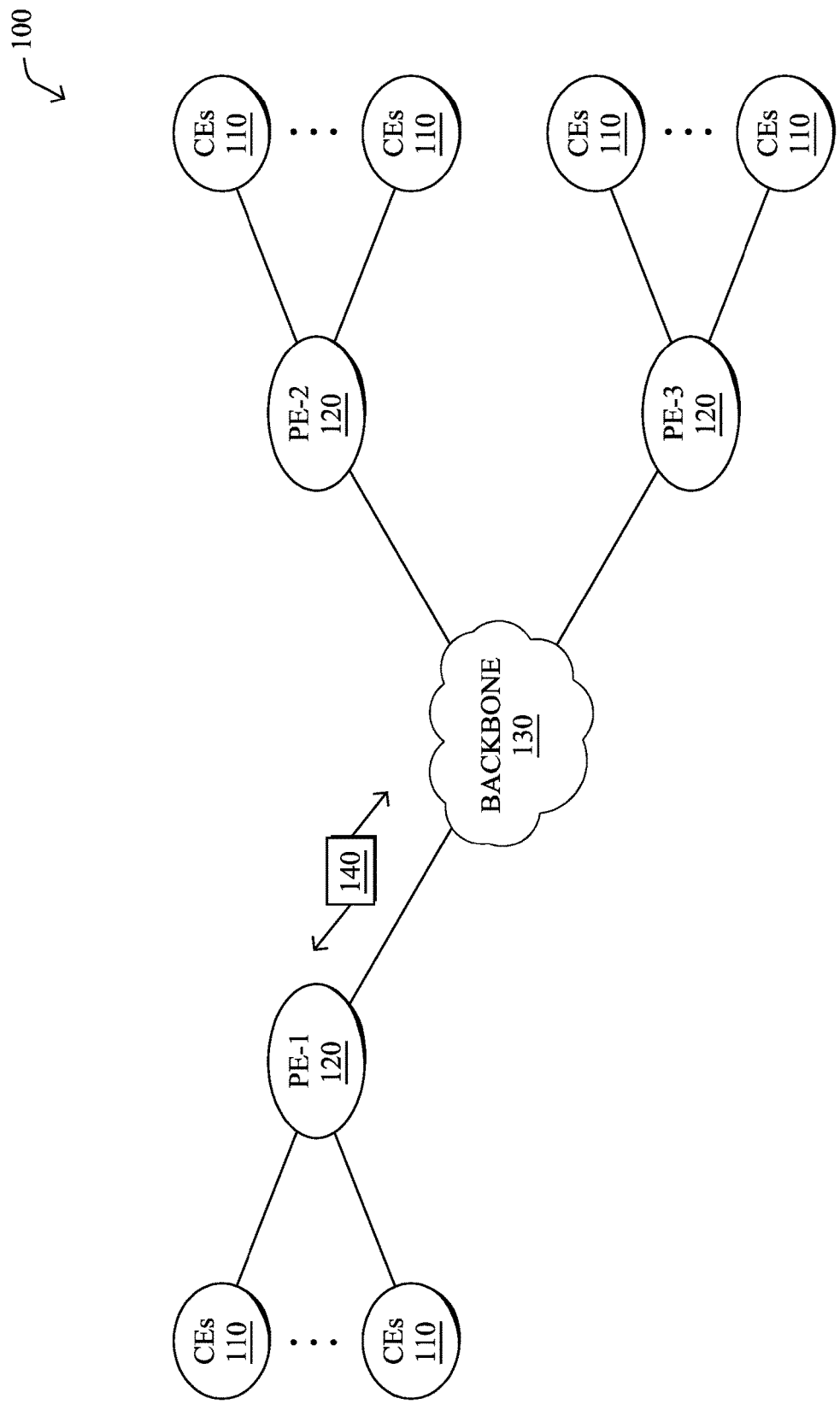
FIGS. 1A-1B illustrate an example communication network.

According to one or more embodiments of the disclosure, a machine learning server in a computer network determines a plurality of computing features shared across a given set of computing products, and collects, from each computing product of the given set, problem-solution data for each computing feature of the plurality of computing features. Problem-solution data is indicative of problems related to a respective computing feature, attempted solution actions for the problems, and outcomes of the attempted solutions on the problem. The machine learning server updates a machine learning model of suggested solutions for computing-feature-specific problems based on the collected problem-solution data, and provides, based on the machine learning model, a particular suggested solution for a particular computing-feature-specific problem to a particular computing product. An outcome of the particular suggested solution for the particular computing-feature-specific problem on the particular computing product may then be fed back to the machine learning server as collected problem-solution data.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. The Internet is an example of a WAN that connects disparate networks throughout the world, providing global communication between nodes on various networks. Other types of networks, such as field area networks (FANs), neighborhood area networks (NANs), personal area networks (PANs), etc. may also make up the components of any given computer network.

The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or power-line communication networks. That is, in addition to one or more sensors, each sensor device (node) in a sensor network may generally be equipped with a radio transceiver or other communication port, a microcontroller, and an energy source, such as a battery. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics.

Figure 1B:
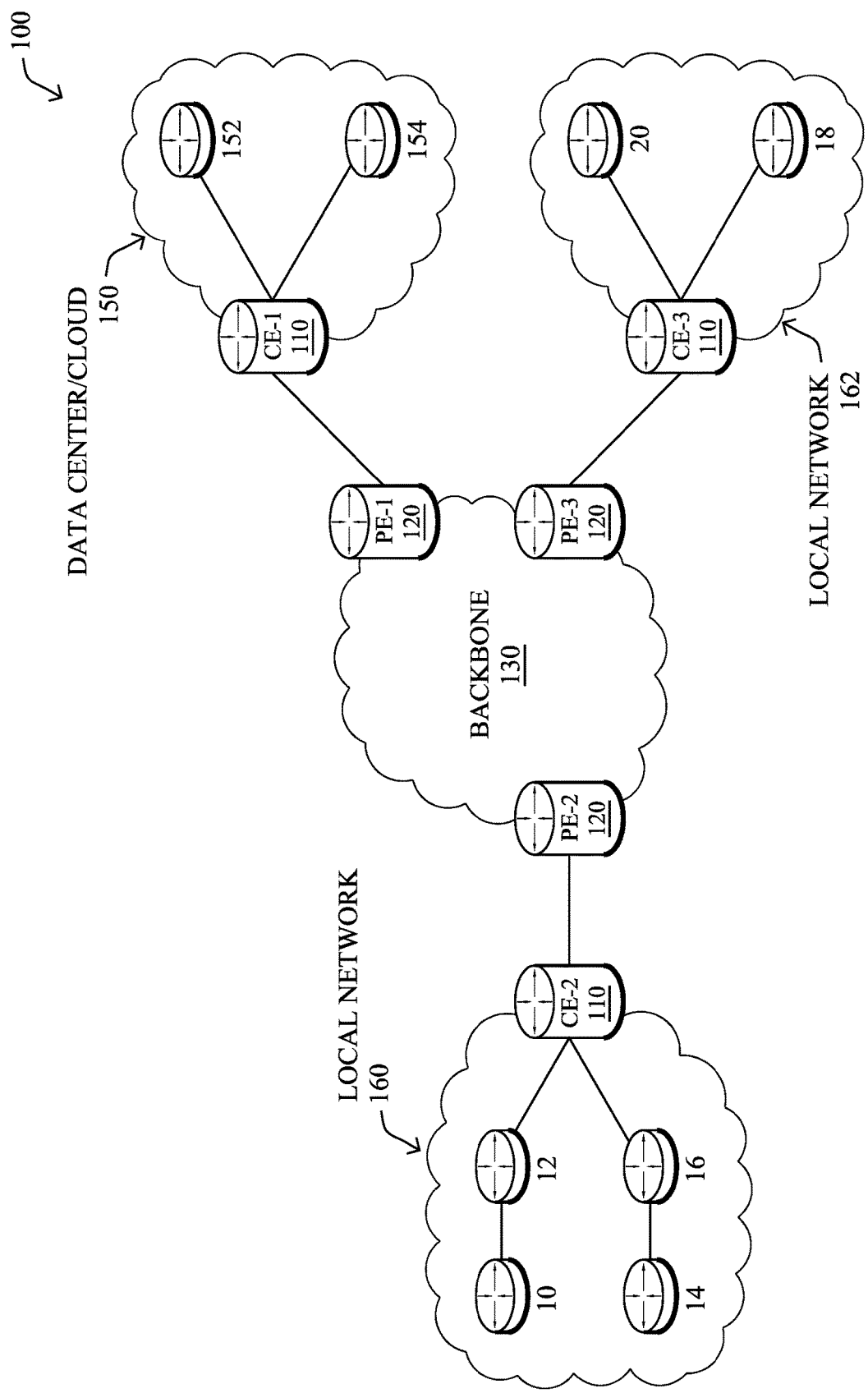

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations. Servers 152-154 may include, in various embodiments, any number of suitable servers or other cloud-based resources. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc. Furthermore, in various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless networks, are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
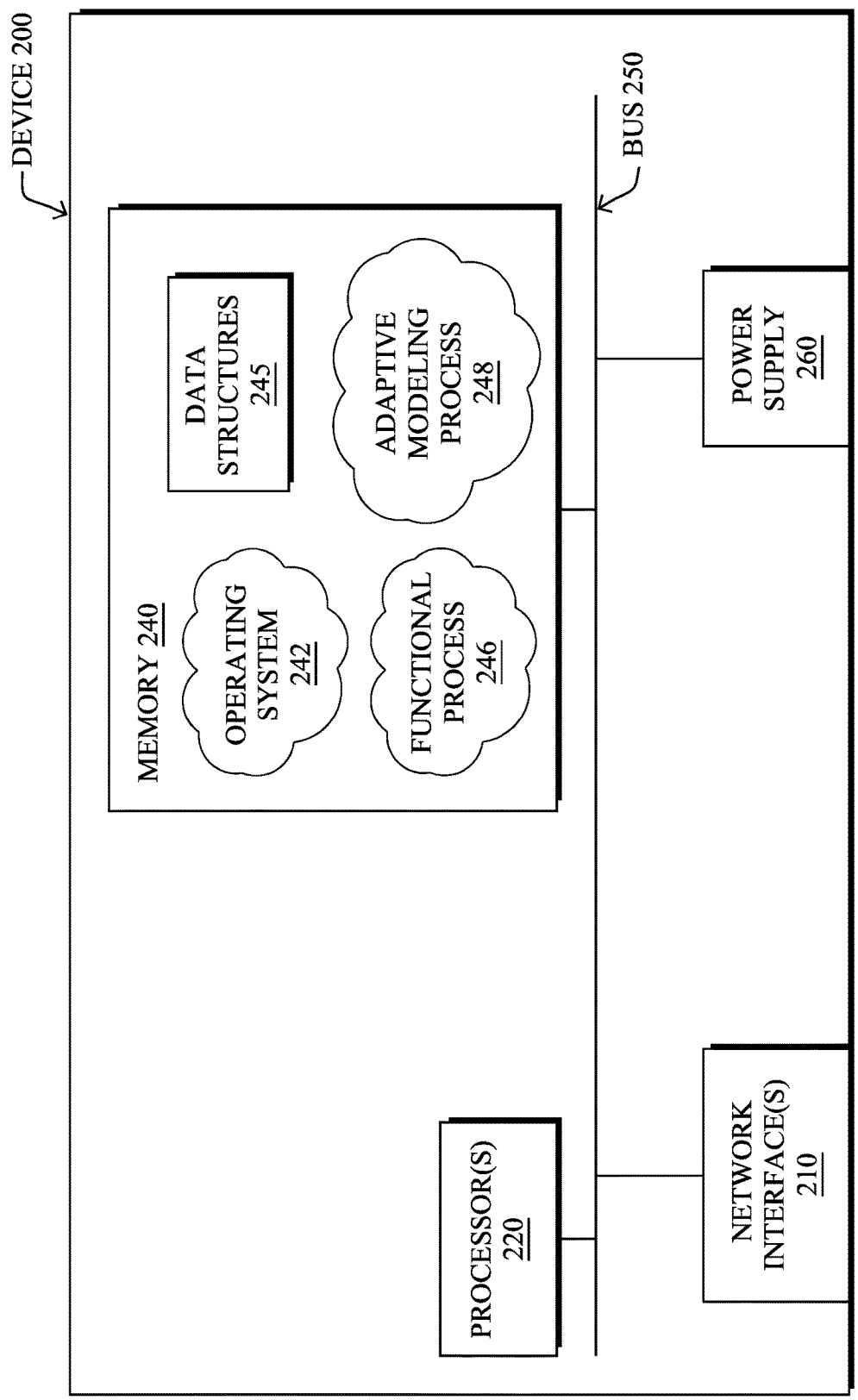
FIG. 2 illustrates an example network device/node.

FIG. 2 is a schematic block diagram of an example computing device 200 that may be used with one or more embodiments described herein e.g., as any of the devices shown in FIG. 1 above, and particularly as specific devices as described further below (e.g., servers, centralized devices, distributed processes, cloud resources, and so on) or any other computing device with access to the operations of network. The device 200 may also be any other suitable type of device depending upon the type of network architecture in place, such as IoT nodes, etc. The device may comprise one or more network interfaces 210 (e.g., wired, wireless, cellular, etc.), at least one processor 220, and a memory 240 interconnected by a system bus 250, as well as a power supply 260 (e.g., battery, plug-in, etc.).

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245 (such as component list database 249, described below). An operating system 242, portions of which are typically resident in memory 240 and executed by the processor, functionally organizes the device by, among other things, invoking operations in support of software processes and/or services executing on the device. These software processes and/or services may comprise one or more functional processes 246, and on certain devices, an illustrative "adaptive modeling" process 248, as described herein. Notably, functional processes 246, when executed by processor(s) 220, cause each particular device 200 to perform the various functions corresponding to the particular device's purpose and general configuration. For example, a server would be configured to operate as a server, a router would be configured to operate as a router, and so on.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In various embodiments as described below, the illustrative adaptive modeling process 248 may utilize machine learning techniques to perform various aspects of the techniques described below. In general, machine learning is concerned with the design and the development of techniques that take as input empirical data (such as network statistics and performance indicators), and recognize complex patterns in these data. One reasonably known pattern among machine learning techniques is the use of an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function would be the number of misclassified points. The learning process then operates by adjusting the parameters a,b,c such that the number of misclassified points is minimal. After this optimization phase (or learning phase), the model M can be used relatively easily to classify new data points. Often, M is a statistical model, and the cost function is inversely proportional to the likelihood of M, given the input data.

Computational entities that rely on one or more machine learning techniques to perform a task for which they have not been explicitly programmed to perform are typically referred to as learning machines. In particular, learning machines are capable of adjusting their behavior to their environment. For example, a learning machine may dynamically make future predictions based on current or prior network measurements, may make control decisions based on the effects of prior control commands, etc.

One class of machine learning techniques that is of particular use in the context of the techniques herein is clustering. Generally speaking, clustering is a family of techniques that seek to group data according to some typically predefined notion of similarity. For instance, clustering is a very popular technique used in recommender systems for grouping objects that are similar in terms of people's taste (e.g., because you watched X, you may be interested in Y, etc.). Typical clustering algorithms are k-means, density based spatial clustering of applications with noise (DB-SCAN) and mean-shift, where a distance to a cluster is computed with the hope of reflecting a degree of anomaly (e.g., using a Euclidian distance and a cluster based local outlier factor that takes into account the cluster density).

—Feature-Specific Adaptive Models for Support Tools—

As noted above, there are countless computer technologies in the world today, the magnitude of which being amplified by the many different combinations of computer hardware, software, and firmware. As also noted, customer issues or internal debugging efforts are handled by support personnel or specific technical assistance engineers, who often can only access information for solving these issues through a query tool, looking through notes of similar issues previously addressed, or through word-of-mouth suggestions coming from others skilled in the technology area.

Given the vast number of computer technologies and combinations, such static and unstructured data is difficult to mine, resulting in inefficiencies or even complete inability to solve the issues at hand. For instance, one problem is that sometimes there are known workarounds or solutions to the customer problems, which could be triggered within software if the system knew exactly how to handle it within a feature, but those workarounds or solutions are difficult to find, especially if they were discovered under another technology group (e.g., a power supply problem solved under the history of product "A", when in fact that same power supply was used in product "B", where the problem may otherwise remain unsolved).

The techniques herein introduce a feature specific machine learning model and leverage the knowledge across other members in a given product family. For example a Power over Ethernet (PoE) experience learned on switch product "A" can be applied for a similar problem description on a switch product "B", if A and B share PoE components and/or configuration. Building a feature-specific knowledge base out of customer experiences for a specific product family, and making the knowledge base shareable across a portfolio, addresses current customer concerns in an efficient way. In particular, as described below, the techniques herein provide module-level solution "pods" (action units) that gain significance over a period of time based on various outcomes (e.g., customer experiences, resolved issues, etc.), and move up on a list of preferred action sets, allowing for further consolidating the knowledge base into the most useful solutions.

Specifically, according to one or more embodiments of the disclosure as described in detail below, a machine learning server in a computer network determines a plurality of computing features shared across a given set of computing products, and collects, from each computing product of the given set, problem-solution data for each computing feature of the plurality of computing features. Problem-solution data is indicative of problems related to a respective computing feature, attempted solution actions for the problems, and outcomes of the attempted solutions on the problem. The machine learning server updates a machine learning model of suggested solutions for computing-feature-specific problems based on the collected problem-solution data, and provides, based on the machine learning model, a particular suggested solution for a particular computing-feature-specific problem to a particular computing product. An outcome of the particular suggested solution for the particular computing-feature-specific problem on the particular computing product may then be fed back to the machine learning server as collected problem-solution data.

Illustratively, the techniques described herein may be performed by hardware, software, and/or firmware, such as in accordance with the "adaptive modeling" process 248, which may include computer executable instructions executed by the processor 220 to perform functions relating to the techniques described herein. Generally, the process 248 may be executed on any suitable network device, such as a server (e.g., local, distributed, cloud-based, etc.), or other device with appropriate visibility, connectivity, and authority.

Operationally, the techniques herein determine computing modules/components ("features") that are used across systems, and then create machine learning problem-solution pairs ("pods") that are specific to each particular module/component (i.e., feature-specific adaptive models), but that are not specific to a particular product or platform. That is, the techniques herein use machine learning to discover issues and solutions applied on a feature-specific basis, allowing a built database of learned solutions (e.g., most-used or most-relevant fixes) to then be applied across any product that might share the same feature. As such, support tools, such as auto-diagnostic programs, troubleshooters, or support personnel assistance (e.g., displayed instructions), can more quickly identify (and use) likely solutions to various problems based on a cross-product machine-learning training set.

Figure 3:
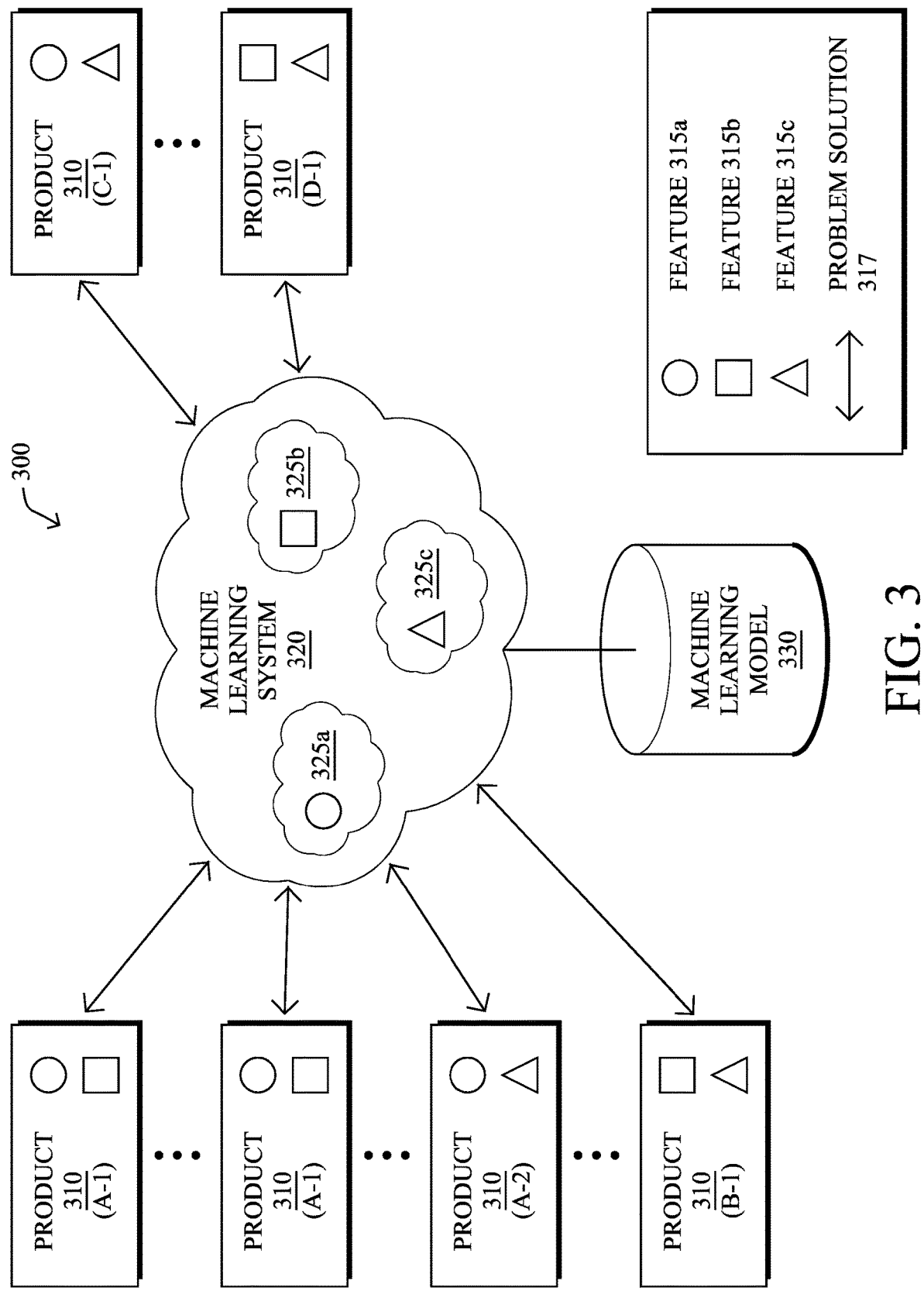
FIG. 3 illustrates an example system for providing feature-specific adaptive models for support tools.

FIG. 3 illustrates an example system 300 for providing feature-specific adaptive models for support tools in accordance with one or more embodiments herein. For instance, a plurality of products 310, with one or more features 315, may be interconnected through an illustrative "problem-solution" exchange 317 to a machine learning system 320 (e.g., one or more machine learning servers).

Products 310 may comprise sets of products managed by a given vendor/manufacturer (e.g., products "A-1", "A-2", and "B-1"), or, if permissions and cooperation exists, from a plurality of diverse entities (e.g., further including products "C-1" from a second entity, and "D-1" from a third entity). Note that products 310 may be any type of computing product, and may comprise different instantiations of the same product (e.g., the "A-1" products), different versions or models of the same type of product (e.g., "A-1" versus "A-2" products, such as a smartphone model number 1 versus a smartphone model number 2), or different products that might still have one or more overlapping features (e.g., "A" products versus "B" products, such as a smartphone versus a laptop, which might share one or more software modules, headphone hardware, and so on).

The features 315 may be based on physical (hardware) modules, software modules, firmware modules, virtual modules, logical modules, and any other modularized/reusable features (aspects, components, etc.) of computing products 310. As shown, features 315a (circles), 315b (squares), and 315c (triangles) are shown across the plurality of products in different configurations, illustrating that some products may share certain features with other products, even if they are different products, platforms, models, versions, etc. Though the true number of available features 315 would be difficult to quantify (e.g., effectively limitless), a few examples may include such things as power supplies, network interfaces, input/output (I/O) interfaces, software programs, software versions, hardware versions, firmware versions, executed protocols, build dates, build facilities, configuration files, library files, number of users, size of file storage, type of file storage, and on and on. Note that computing features 315 may also comprise a plurality of parent categories of computing features and a plurality of sub-categories of specific configurations of given computing features. For instance, power supplies are different from network interfaces, but within power supplies, various sub-categories such as specific models or types (e.g., "model 1", "model 2", "type A", "type B", etc.), or even build dates or locations of the power supplies, may further refine the models built by the techniques herein.

Through the illustrative "problem-solution" exchange 317, e.g., network links, communication protocol messages, and so on, the products 310 may share problem-solution data regarding the features 315 with a machine learning system 320 (e.g., one or more machine learning servers), as described herein. In particular, the feedback system allows the machine learning system 320 to collect useful data about successful or failed feature-specific solution attempts for particular problems. Each feature 315 may be collected by a corresponding "feature engine" 325 of the machine learning system 320, such as features 315a from the different computing products being collected into engine 325a, while features 315b and 315c are collected into 325b and 325c, respectively.

The machine learning system 320 takes the feedback inputs, and updates a machine learning model 330, through various machine learning techniques as will be appreciated by those skilled in the art. For example features may be clustered into overlapping similarities (e.g., power supplies versions 1-3 all have the same successful problem-solution pairs), or may be de-clustered or further refined where differentiations are determined (e.g., power supply version 1 made in factory 1 suffers from different problems or has different solutions from power supply version 1 made in factory 2). As more problem-solution data is received, the machine learning model 330 can become more refined over time, dynamically ranking the best or most-likely possible solutions to given problems. Such an adaptive model is integral to the techniques herein, since different problems may arise over time given the constantly changing nature of computing, the many different combinations and configurations, and so on. (Also, solutions that worked at one point may no longer be as successful, for instance, where another change in another feature affects the solution in a way that is yet to be determined.)

As one example, assume that a smartphone manufacturer is experiencing trouble with its speakers for certain models of the smartphone. The techniques herein would thus be able to sort through a large number of potential solutions (e.g., volume setting, disabling the speaker and re-enabling it, closing all apps running on the phone, etc.), and may determine that someone tried to place the phone in "airplane mode" and rebooted the phone, and the speaker problem was fixed. From there, the machine learning system could suggest that solution to various smartphones experiencing the problem, and can train the data set to determine which particular models of smartphones are corrected by this proposed solution (e.g., model 1 is not, but models 2-3 are). In this example, when presented with the problem of a malfunctioning speaker for the smartphone, if the system determines that the smartphone is model 2 or model 3, it may confidently suggest the "airplane mode reboot" solution. If it is a model 1 smartphone, however, this solution may be less confident, and other solutions may be attempted that are more relevant to speakers of model 1, in particular.

Figure 4:
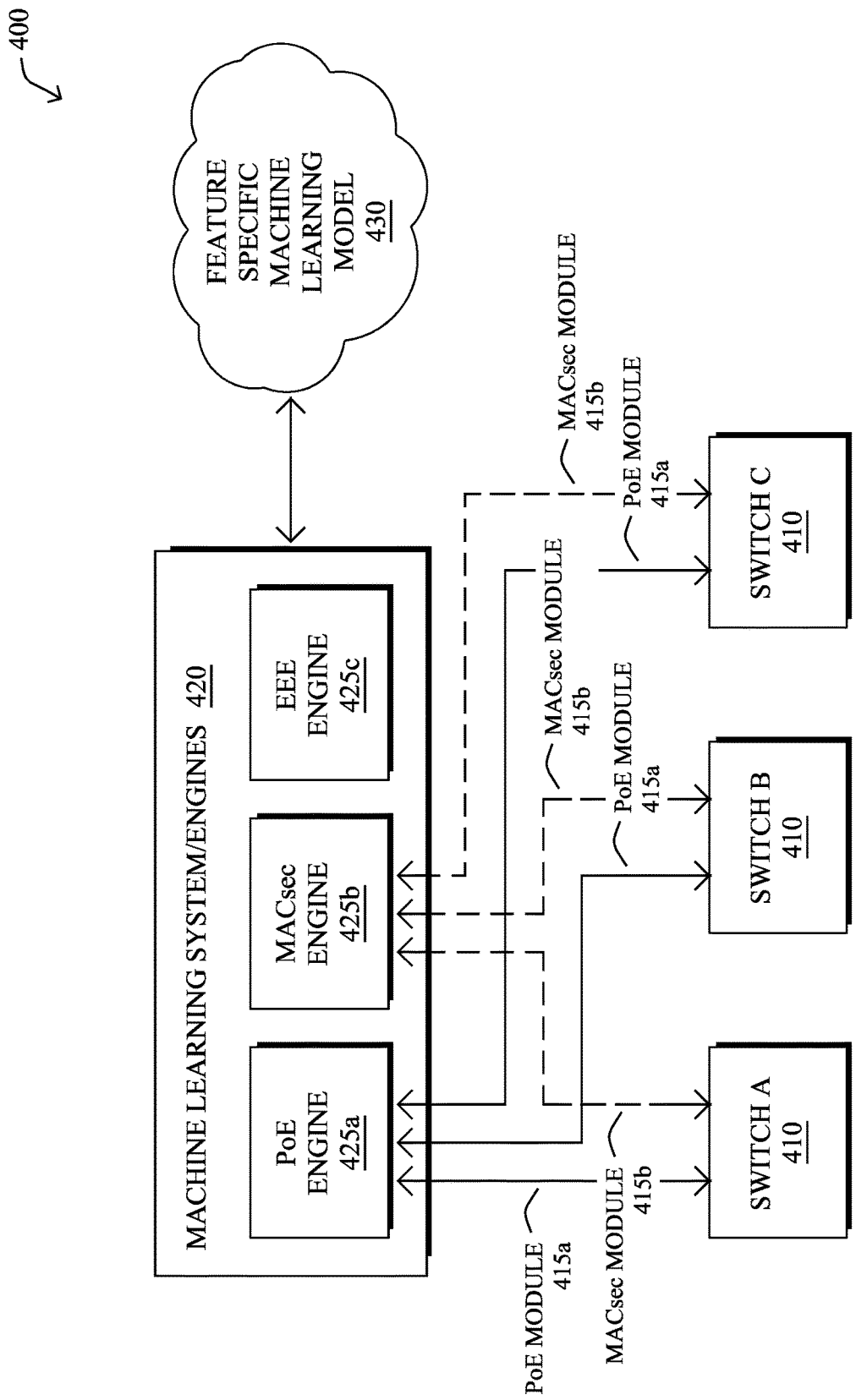
FIG. 4 illustrates a specific example system for providing feature-specific adaptive models for support tools.

An example solution specific to network switches is shown in the environment 400 of FIG. 4, where a plurality of switches 410 (e.g., computing products 310, illustratively different models of a same product family, e.g., "A", "B", and "C") interact with a feature-specific machine learning service (system/engine) 420 to find issues and suggest and/or apply solutions from a feature-specific machine learning model 430, as mentioned above.

In particular, the switches may each be configured with a corresponding computing feature module 415 (e.g., 415*a* for PoE Module, 415*c* for a MAC security (MACsec) module, and so on) that sends feature specific data to respective sub-modules/engines 425 of the machine learning engine 420 (e.g., 425*a-c*, showing an additional module 425*c* for Energy-Efficient-Ethernet (EEE), and any others not shown for clarity). For example, the machine learning engine 420 may thus train itself (updating model 430) for PoE-related problems and solutions by taking data sets from PoE modules of all of the switches, irrespective of the family or model.

Figure 5:
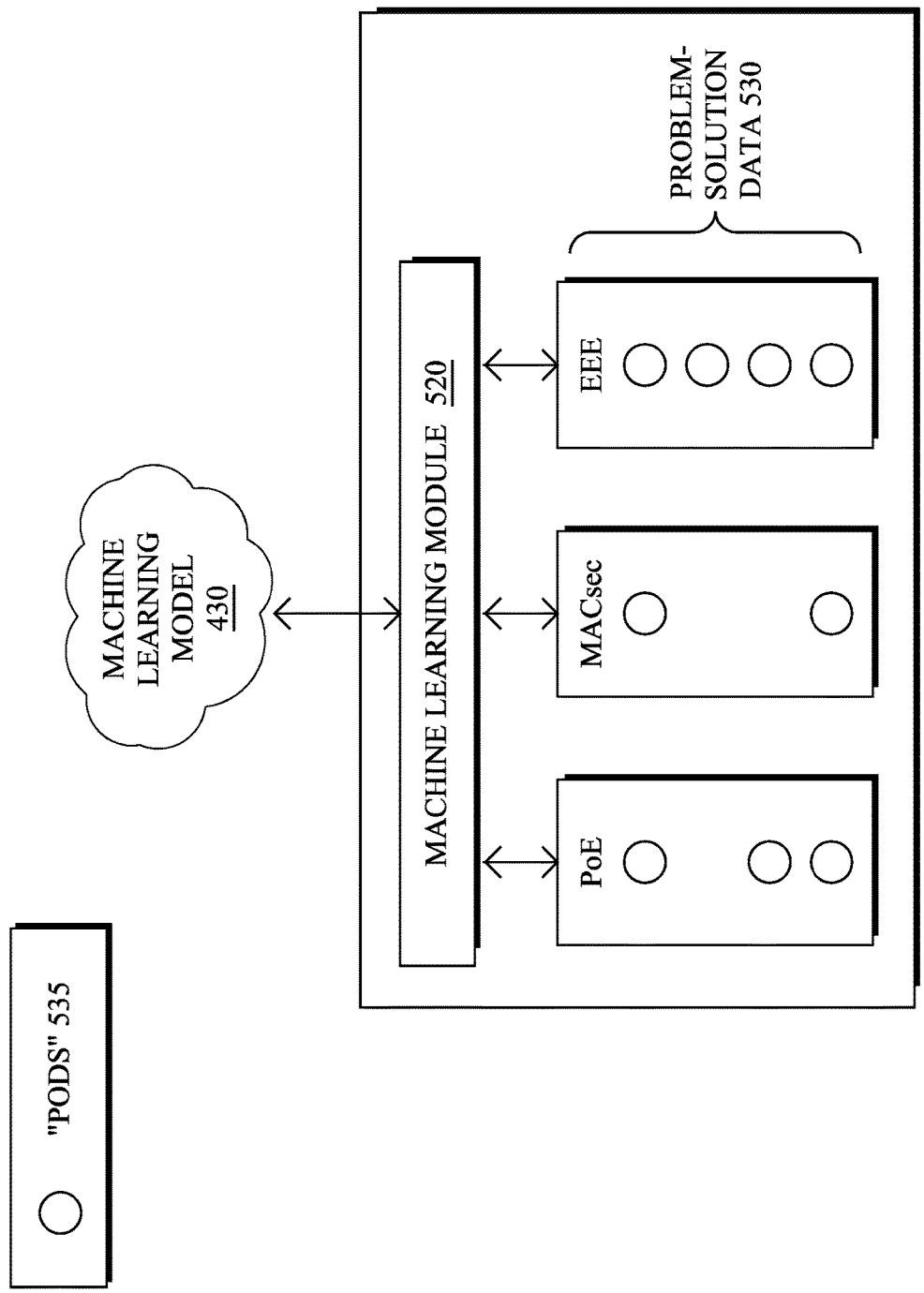
FIG. 5 illustrates an example of problem-solution "pods" in a machine learning system providing feature-specific adaptive models for support tools.

With reference to alternative view 500 in FIG. 5, the system level Machine Learning Module (MLM) 520 interacts with the feature specific (PoE, EEE, MACsec, Traffic, Power, Stack, etc.) modules to generate problem-solution data 530 that may be managed locally within machine learning model 430, or else pushed to one or more machine learning engines in the cloud. This data is thus used as a training 'data set' by the machine learning model 430. The MLM 520 receives recommendations from the machine learning model (e.g., locally or in the cloud) and triggers pre-defined actions (solution "pods" 535) on the corresponding device. The outcome (success or failure) of the attempted solutions (pods) may then be pushed back to the machine learning model, which helps the engine with further training and building of the knowledge base. Along with this, feature level information such as state machine transitions etc., may be sent as a snapshot to the learning engine for further refinement and/or future predictions (e.g., creating new feature categories based on discovered correlations, such as build date, location, device temperature, and so on).

Notably, in accordance with one or more aspects of the embodiments herein, module level solution pods 535 (action units) are specific units, which are triggered by the MLM based on pre-defined actions. For example, an illustrative EEE subsystem may have 'n' number of solution pods, such as renegotiating with a partner, resetting the PHY (physical layer) port, etc. Based on the recommendation from the machine learning model, therefore, certain solution pods will be triggered (i.e., attempted solutions for a given problem).

Illustratively, the feature-specific machine learning service may be a pre-trained model, e.g., "seeded" based on well-known issues and solutions for a specific feature to start with. Since the model is created on per feature basis, it can utilize the training and learnings from other products which have similar features, and customers may have the option to opt-in (or out) for participation for such machine learning services. Over time, the machine learning model will be based on sufficient data to predict and suggest a probable solution for the customer case for a specific feature-related problem.

As a specific example, a given feature-specific problem such as a problematic PoE (Power over Ethernet) module may be addressed using the techniques described herein. Assume, for instance, that an enterprise product family of switches (e.g., switches A-C above) mostly use the same kind of PoE PSE (Power Sourcing Equipment) controllers and PHY vendors, and also sometime even same software PoE state machine module, while the product development and marketing might be across different geographical locations. Most likely, issues experienced at various customer sites would be similar in nature. Using the techniques herein, the feature-specific MLM model 430 shares the acquired knowledge base across products (switches A-C). For example, a real world PoE issue with third party PD (Powered Devices) could be an "Imax Error" (Current Overdrawn, i.e., over an electrical current "I" max value) because of a lack of standards compliance. Each product, depending upon the vendor silicon, suggests various workarounds to help the customers. Suppose customers for a particular product (e.g., switch A) had experienced an Imax (Over current), but two different customers applied a different workaround, which was then learned by the MLM module:

Solution 1:

```
DataSet { Feature=PoE, Port=GigabitEthenet, PortState=Normal,
VendorSilicon ID=BCM59121, PortPowerSettings={DevClass,
Vsense=54V, PowerAllocation, IcutScale=0xD, GlobalThresholdSetting},
GlobalTimeStamp},
  DataSet { Feature=PoE, PortState=ImaxShut, VendorSilicon
ID=BCM59121, PortPowerSettings={DevClass, PowerAllocation,
IcutScale, GlobalThresholdSetting}, GlobalTimeStamp},
  ActionPOD { ID= 1002, CLISeq: 1 - "shut", 2. "no shut", 3 - "power
inline port icutscale mode 2x value 0xE"}
```

Solution 2:

```
DataSet { Feature=PoE, PortState=Normal, VendorSilicon
ID=Si3458Rev0_4, PortPowerSettings={DevClass, Vsense=53V,
PowerAllocation, IcutScale=0xE, GlobalThresholdSetting},
GlobalTimeStamp},
  DataSet { Feature=PoE, PortState=ImaxShut, VendorSilicon
ID=Si3458Rev0_4, PortPowerSettings={DevClass, PowerAllocation,
IcutScale=0xE, GlobalThresholdSetting}, GlobalTimeStamp},
  ActionPOD { ID 101, CLISeq: 1 - "power inline static max 16000",
2 - "shut", 3. "no shut"}
```

In the above two examples, the problem is same but the solutions applied varied for two different products and vendor silicons. A successful ActionPOD set for a given problem data set and number instances of such occurrences will thus create a decision tree as a feature-specific predictive model (e.g., switch A, but which VendorSilicon ID?). This maps the observation about an experience to conclusions about the intended features' action.

Now, given a similar situation for another customer, assume the following data set for a PoE failure on the "switch A" product:

```
DataSet { Feature=PoE, PortState=Normal, VendorSilicon
ID=BCM59121, PortPowerSettings={DevClass, Vsense=53V,
PowerAllocation, IcutScale=0xE, GlobalThresholdSetting},
GlobalTimeStamp},
  DataSet { Feature=PoE, PortState=ImaxShut, VendorSilicon
ID=Si3458Rev0_4, PortPowerSettings={DevClass, PowerAllocation,
IcutScale=0xE, GlobalThresholdSetting}, GlobalTimeStamp},
```

In this situation, the customer has VendorSilicon ID=BCM59121, Vsense=53 Volts, and Icut setting=0xE. Assuming that ActionPOD "power inline port icutscale mode 2x value <value>" is not available on this device, the Vsense and Icutscale shall result in a new power value, e.g. 17000, that will be applied (e.g., through instruction or via an available command line interface (CLI)). A new ActionPOD for this product may then be created as follows:

```
ActionPOD { ID 102, CLISeq: 1 - "power inline static max 17000",
2 - "shut", 3. "no shut"};
  Pport = Vport × Iport;
  Iport = 20mA + IcutScale × factor (which is a vendor constant).
```

Clearly, any viable problem-solution paradigm may be established for different types of features, and according to different implementations of the techniques herein, and any suitable level of detail may be included therein. For instance, the above illustration, with specific reference to PoE for enterprise switches, is merely meant as an example to demonstrate the level of detail available within the data sets 530, pods 535, machine learning model 430, and so on. Problem-solution pairs may range from simple (e.g., "speaker not working→turn up volume") to complex (e.g., "speaker model XYZ made in factory F-17 within this particular date range, while operating at a temperature above TEMP with location services GPS enabled does not work→increase voltage to speaker by 10% after TEMP decreased and power-cycle device with GPS services disabled"). Effectively, the possibilities are endless, and the machine learning techniques herein will be very beneficial to service technicians or service applications facing the myriad of customer issues that could possibly surface, allowing support tools to more effectively solve such problems satisfactorily.

Figure 6:
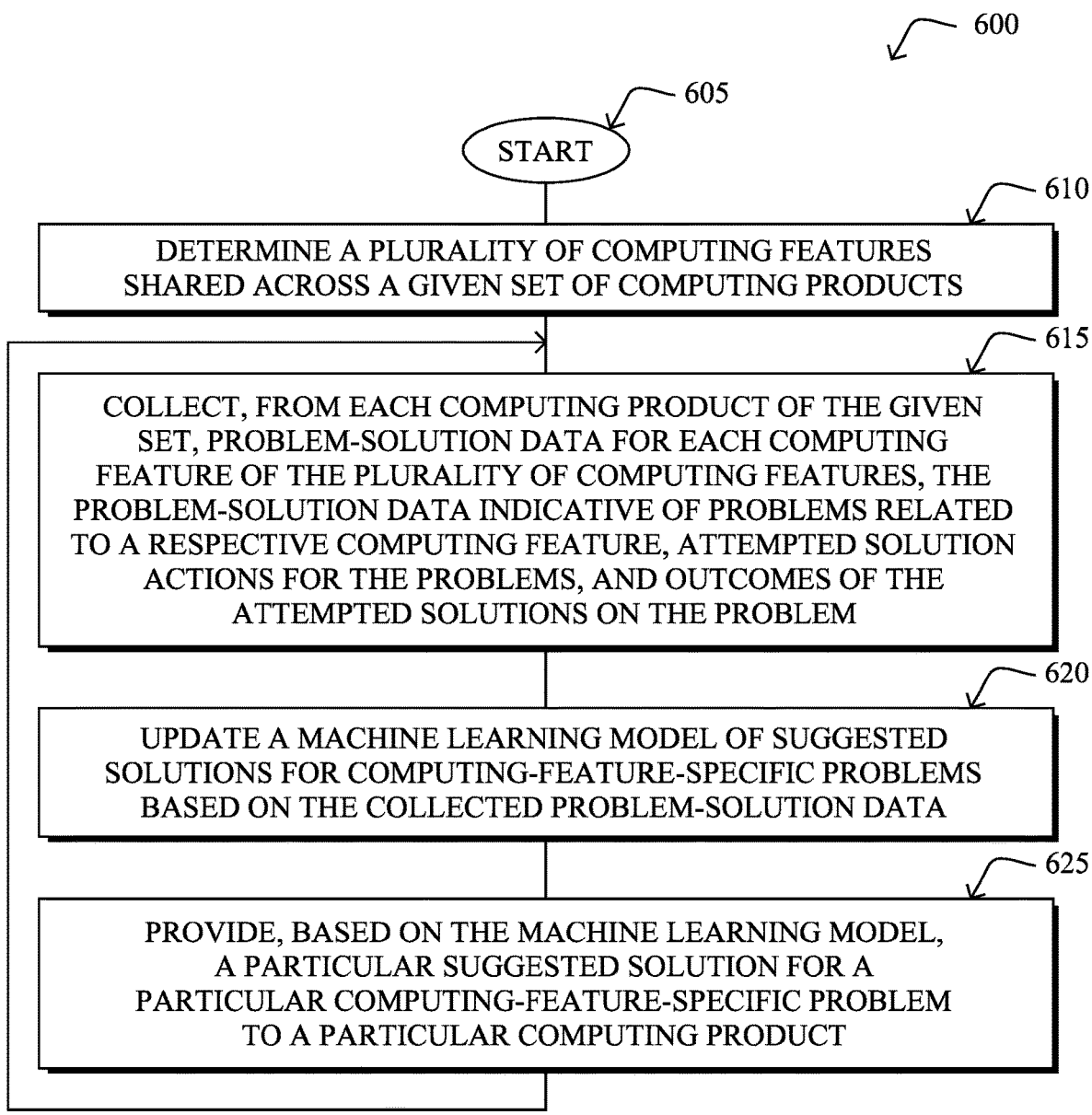
FIG. 6 illustrates an example simplified procedure for providing feature-specific adaptive models for support tools, particularly from the perspective of a machine learning server.

FIG. 6 illustrates an example simplified procedure for providing feature-specific adaptive models for support tools in accordance with one or more embodiments described herein, particularly from the perspective of a machine learning server (e.g., system 320). For example, a non-generic, specifically configured device (e.g., device 200 as machine learning server/system 320) may perform procedure 600 by executing stored instructions (e.g., process 248). The procedure 600 may start at step 605, and continues to step 610, where, as described in greater detail above, a machine learning server/system in a computer network determines a plurality of computing features 315 (e.g., hardware, software, and firmware features), shared across a given set of computing products 310 (e.g., diverse computing products, computing products managed by a particular entity or a plurality of diverse entities, etc.). As mentioned above, computing features may comprise a plurality of parent categories of computing features (e.g., "power supplies", "network interfaces", etc.) and a plurality of sub-categories of specific configurations of given computing features (e.g., "model 1", "model 2", "type A", "type B", etc.) within each parent category.

In step 615, the machine learning server collects problem-solution data 317 for each computing feature of the plurality of computing features from each computing product of the given set. As described above, the problem-solution data is indicative of problems related to a respective computing feature, attempted solution actions for the problems, and outcomes of the attempted solutions on the problem. In one embodiment, problem-solution data 317 is further indicative of feature-level information (e.g., state machine status, etc., as mentioned above). Note that as described herein, in one specific embodiment each computing feature 315 on the computer products 310 has a corresponding computing feature module 415 configured to interact with the machine learning system 320 (e.g., with corresponding feature engines 325).

In step 620 the machine learning server updates its machine learning model 330 of suggested solutions for computing-feature-specific problems based on the collected problem-solution data. Note that the machine learning model may first be seeded with known problem-solution data. Also, as mentioned above, the machine learning model of suggested solutions may weight sub-categories more heavily than parent categories (e.g., a solution for "model 1" may be more significant to another "model 1" feature, than a generic "power supply" solution).

The machine learning server may then provide, based on the machine learning model, a particular suggested solution for a particular computing-feature-specific problem to a particular computing product in step 625. For example, the machine learning server may send instructions to the particular computing product, or may display the particular suggested solution to an operator (e.g., admin, user, etc.) of the particular computing product. Note that when there is a plurality of suggested solutions available for the particular computing-feature-specific problem, the machine learning server may select one of the plurality of suggested solutions available (e.g., a best-ranked suggested solution according to the machine learning model) as the particular suggested solution provided.

The procedure 600 may then return to step 615, where an outcome of the particular suggested solution for the particular computing-feature-specific problem on the particular computing product is fed back as collected problem-solution data. Note that the procedure may also determine further features, such as through manual configuration, or else through machine learning techniques applied to data (e.g., determining that a date or place of manufacture of a particular power supply is relevant and separable as a feature worth tracking for appropriate solutions).

Figure 7:
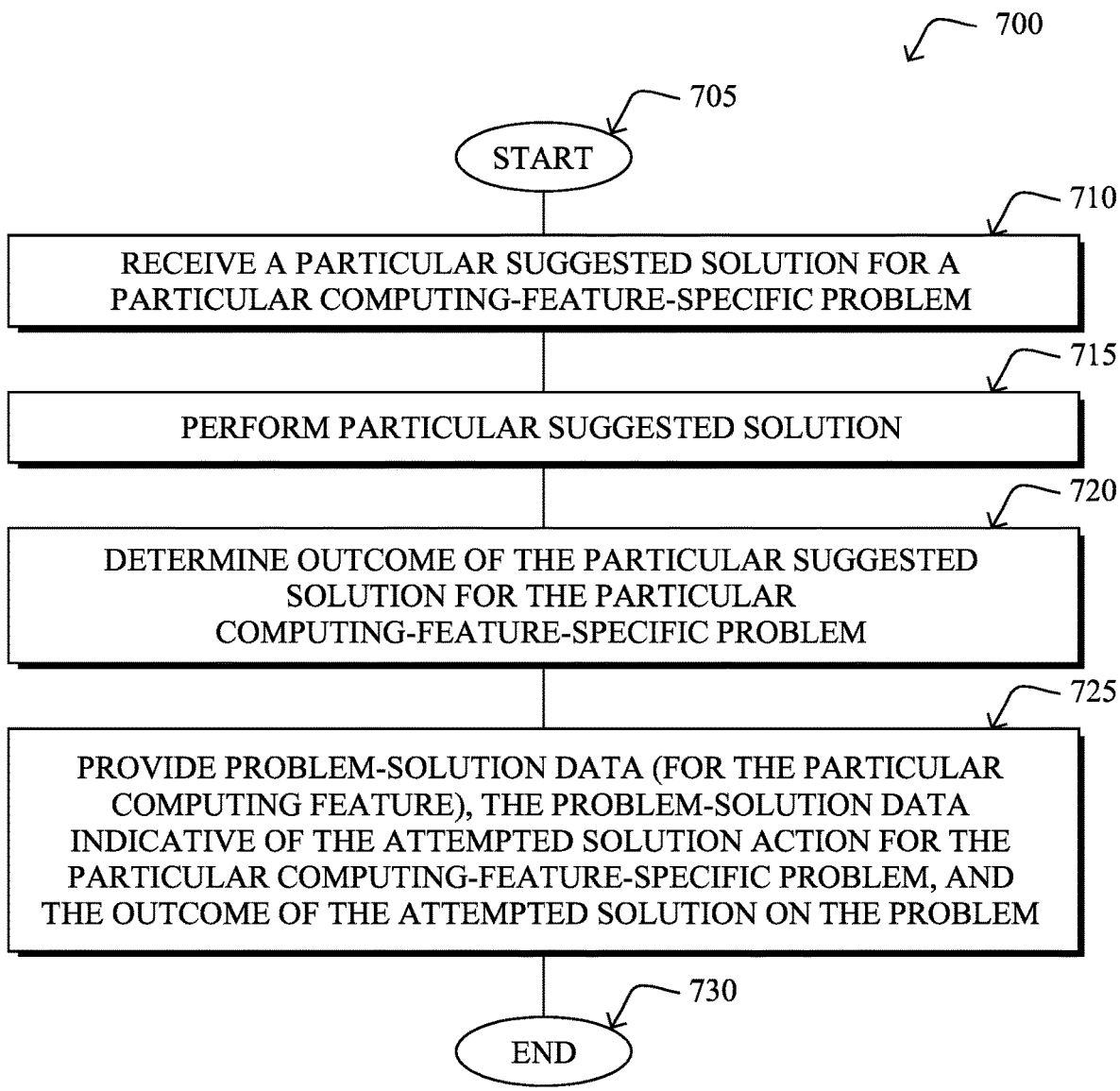
FIG. 7 illustrates another example simplified procedure for providing feature-specific adaptive models for support tools, particularly from the perspective of a computing product.

Further, FIG. 7 illustrates an example simplified procedure for providing feature-specific adaptive models for support tools in accordance with one or more embodiments described herein, particularly from the perspective of a computing product 310. For example, a non-generic, specifically configured device (e.g., device 200 as product 310) may perform procedure 700 by executing stored instructions (e.g., process 248). The procedure 700 may start at step 705, and continues to step 710, where, as described in greater detail above, a particular computing product 310 may receive, based on the machine learning model 330, a particular suggested solution for a particular computing-feature-specific problem. For instance, assuming that a problem is detected on the product, such as automatically or else by an operator of the particular computing product, the machine learning system 320 above may determine an appropriate problem-solution pair, and may send instructions to the particular computing product, or may display the particular suggested solution to an operator of the particular computing product, who then enters/submits instructions to the product (e.g., CLI input).

In step 715, the product may perform the particular suggested solution, and in step 720 determines an outcome of the particular suggested solution for the particular computing-feature-specific problem on the particular computing product. Accordingly, the product may then provide, in step 725, the associated problem-solution data for the computing feature, the problem-solution data indicative of problems related to a respective computing feature, attempted solution actions for the problems, and outcomes of the attempted solutions on the problem (e.g., and feature-level information). Note that as described above, each computing feature 315 on the computer product may have a corresponding computing feature module 415 configured to interact with the machine learning server.

The illustrative simplified procedure 700 may then end in step 730, having either solved the problem or failed at solving the problem, at which time the procedure may restart with new suggested solutions. In either event, the problem-solution data generated by the product may be used by the machine learning system to further refine its machine learning model, accordingly.

It should be noted that while certain steps within procedures 600-700 may be optional as described above, the steps shown in FIGS. 6-7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 600-700 are described separately, certain steps from each procedure may be incorporated into each other procedure, and the procedures are not meant to be mutually exclusive.

The techniques described herein, therefore, provide feature-specific adaptive models for support tools. In particular, the techniques herein decrease the mean time between failures, reduce the wait time between support specialists and engineering team technicians, particularly across different geographical locations. This improves the customer experience, because the MLM is able to reach to a probable solution faster. It also greatly increases the database knowledge on the issues seen by customer, which can be used as an input for future product designs.

While there have been shown and described illustrative embodiments that provide for feature-specific adaptive models for support tools, it is to be understood that various other adaptations and modifications may be made within the spirit and scope of the embodiments herein. For example, while certain embodiments are described herein with respect to certain computer technologies, such as computer network technologies (e.g., hardware such as switches, routers, power components, etc., or software such as certain switching or routing protocols, etc.), the techniques herein are not limited as such, and may be used for any type of technology, whether hardware, software, firmware, logical modules, and so on.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
    determining, by a machine learning server in a computer network, a plurality of computing features shared across a given set of computing products, wherein the plurality of computing features includes an enterprise computer networking feature comprising at least Power over Ethernet (PoE), further wherein the given set of computing products includes a network switch and comprises a plurality of diverse computing products different than the network switch;
    collecting, by the machine learning server from each computing product of the given set, problem-solution data for each computing feature of the plurality of computing features, the problem-solution data indicative of problems related to a respective computing feature, attempted solution actions for the problems, and outcomes of the attempted solutions on the problem;
    updating, by the machine learning server, a machine learning model of suggested solutions for computing-feature-specific problems based on the collected problem-solution data;
    selecting, by the machine learning server, a particular suggested solution from a plurality of suggested solutions for a particular computing-feature-specific problem; and
    providing, by the machine learning server based on the machine learning model, the particular suggested solution to a particular computing product, wherein an outcome of the particular suggested solution for the particular computing-feature-specific problem on the particular computing product is fed back to the machine learning server as collected problem-solution data.

2. The method as in claim 1, wherein providing comprises:
    sending instructions to the particular computing product.

3. The method as in claim 1, wherein providing comprises:
    displaying the particular suggested solution to an operator of the particular computing product.

4. The method as in claim 1, wherein selecting is based on a best-ranked suggested solution according to the machine learning model.

5. The method as in claim 1, wherein the plurality of computing features comprises a plurality of parent categories of computing features and a plurality of sub-categories of specific configurations of given computing features within each parent category.

6. The method as in claim 5, wherein the machine learning model of suggested solutions weights sub-categories more heavily than parent categories.

7. The method as in claim 1, wherein the plurality of computing features are based on one or more of hardware features, software features, and firmware features.

8. The method as in claim 1, wherein each computing feature on the computer products has a corresponding computing feature module configured to interact with the machine learning server.

9. The method as in claim 1, wherein the given set of computing products comprises a plurality of computing products managed by a particular entity.

10. The method as in claim 1, wherein the given set of computing products comprises a plurality of computing products managed by a plurality of diverse entities.

11. The method as in claim 1, further comprising:
    seeding the machine learning model with known problem-solution data.

12. The method as in claim 1, wherein problem-solution data is further indicative of feature-level information.

13. A tangible, non-transitory, computer-readable medium storing program instructions that cause a computer to execute a process comprising:
    determining a plurality of computing features shared across a given set of computing products wherein the plurality of computing features includes an enterprise computer networking feature comprising at least Power over Ethernet (PoE), further wherein the given set of computing products includes a network switch and comprises a plurality of diverse computing products different than the network switch;

collecting, from each computing product of the given set, problem-solution data for each computing feature of the plurality of computing features, the problem-solution data indicative of problems related to a respective computing feature, attempted solution actions for the problems, and outcomes of the attempted solutions on the problem;

updating a machine learning model of suggested solutions for computing-feature-specific problems based on the collected problem-solution data;

selecting a particular suggested solution from a plurality of suggested solutions for a particular computing-feature-specific problem; and providing, based on the machine learning model, a particular suggested solution to a particular computing product, wherein an outcome of the particular suggested solution for the particular computing-feature-specific problem on the particular computing product is fed back to the process as collected problem-solution data.

14. The computer-readable medium as in claim 13, wherein the process when executed to provide further comprises one of either:

sending instructions to the particular computing product; and displaying the particular suggested solution to an operator of the particular computing product.

15. The computer-readable medium as in claim 13, wherein the plurality of computing features comprises a plurality of parent categories of computing features and a plurality of sub-categories of specific configurations of given computing features within each parent category.

16. An apparatus, comprising:

one or more network interfaces configured to communicate in a computer network;

a processor coupled to the network interfaces and adapted to execute one or more processes; and a memory configured to store a machine learning process executable by the processor, the process when executed operable to:

determine a plurality of computing features shared across a given set of computing products wherein the plurality of computing features includes an enterprise computer networking feature comprising at least Power over Ethernet (PoE), further wherein the given set of computing products includes a network switch and comprises a plurality of diverse computing products different than the network switch;

collect, from each computing product of the given set, problem-solution data for each computing feature of the plurality of computing features, the problem-solution data indicative of problems related to a respective computing feature, attempted solution actions for the problems, and outcomes of the attempted solutions on the problem;

update a machine learning model of suggested solutions for computing-feature-specific problems based on the collected problem-solution data;

select a particular suggested solution from a plurality of suggested solutions for a particular computing-feature-specific problem; and provide, based on the machine learning model, a particular suggested solution for a particular computing-feature-specific problem to a particular computing product, wherein an outcome of the particular suggested solution for the particular computing-feature-specific problem on the particular computing product is fed back to the process as collected problem-solution data.

17. The apparatus as in claim 16, wherein the machine learning process when executed to provide is further operable to one of either:

send instructions to the particular computing product; and display the particular suggested solution to an operator of the particular computing product.

\* \* \* \* \*